Figures 3, 4, 5:
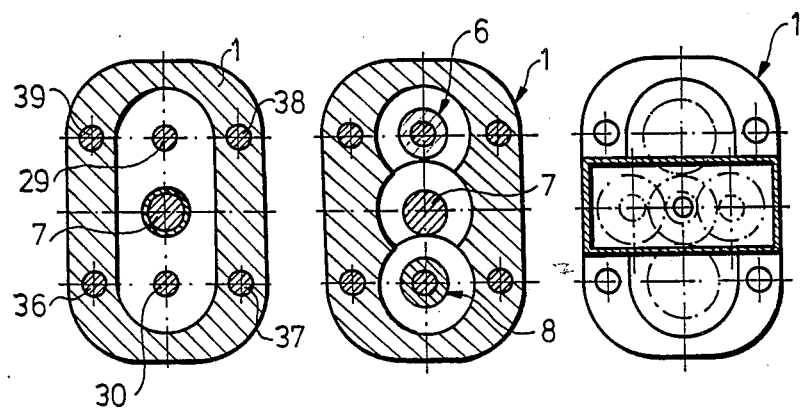

United States Patent [19]

Tatai et al.

[11] Patent Number: 4,784,340
[45] Date of Patent: Nov. 15, 1988

[54] APPARATUS FOR COMMUNITION OF ORGANIC MATTERS

[75] Inventors: Ilona Tatai; Gusztáv Gündisch; Géza Szots; Károly Molnár, all of Budapest, Hungary

[73] Assignee: Taurus Gumiipari Vallalat, Budapest, Hungary

[21] Appl. No.: 69,608

[22] Filed: Jul. 2, 1987

[30] Foreign Application Priority Data

Jul. 2, 1986 [HU] Hungary ............................ 2761/86

[51] Int. Cl.$^4$ ............................................ B02C 19/12
[52] U.S. Cl. ............................ 241/301; 241/DIG. 31; 241/DIG. 38
[58] Field of Search ............ 241/28, 1, 301, 248, 241/280, DIG. 31, 246, 247, 277, 95, DIG. 38

[56] References Cited

U.S. PATENT DOCUMENTS

| | | | |
|---|---|---|---|
| 3,215,355 | 11/1965 | Shouvlin et al. | 241/247 |
| 4,274,786 | 6/1981 | Svensson et al. | 241/247 X |
| 4,474,334 | 10/1984 | Tatai et al. | 241/1 |

FOREIGN PATENT DOCUMENTS 1114755 6/1986 Japan ................................ 241/247

Primary Examiner—Mark Rosenbaum
Attorney, Agent, or Firm—Handal & Morofsky

[57] ABSTRACT

The invention relates to an apparatus for the comminution of organic matters, the comminuting unit of which consists of at least one tool provided with axial and/or radial yielding holes and co-acting axially driven stamp. The essential feature of the invention is that a compacting unit (4) before the comminuting unit (5)—in respect of the direction of movement of the organic matter to be comminuted—and a feeding-precompacting unit (3) preceding the compacting unit (4) are arranged, furthermore the feeding-precompacting unit (3) is provided with driven worms (6, 7, 8), the discharge end of which is connected with the large cross sectional end of the bell-mouthed narrowing chambers (18, 19) while its reduced cross sectional end is joined to the pressure chamber (28) of the tools (20, 21).

20 Claims, 4 Drawing Sheets

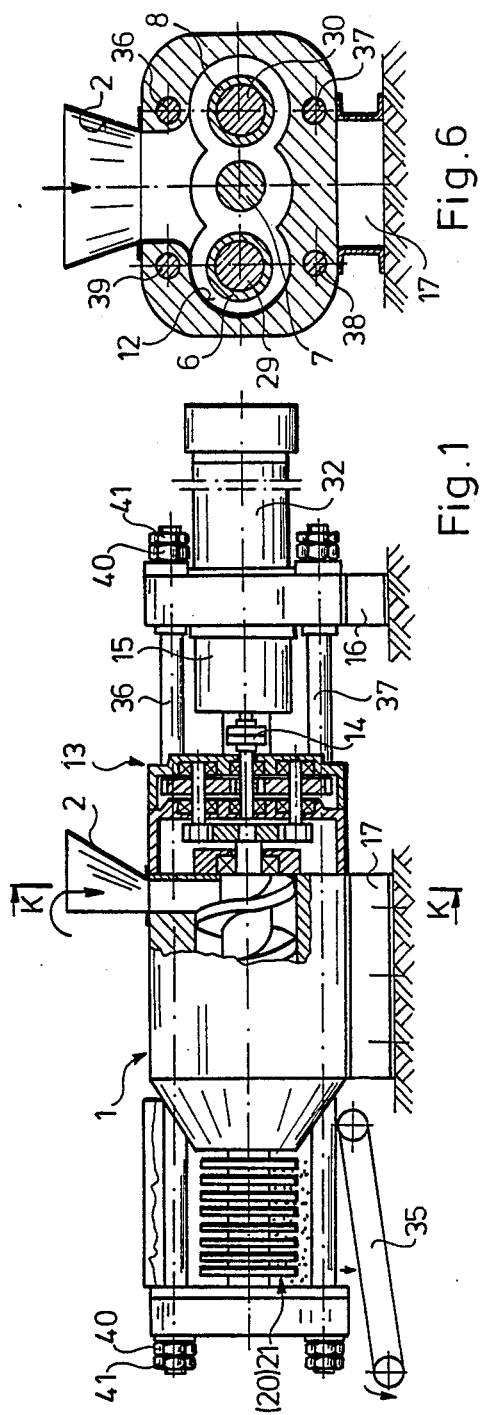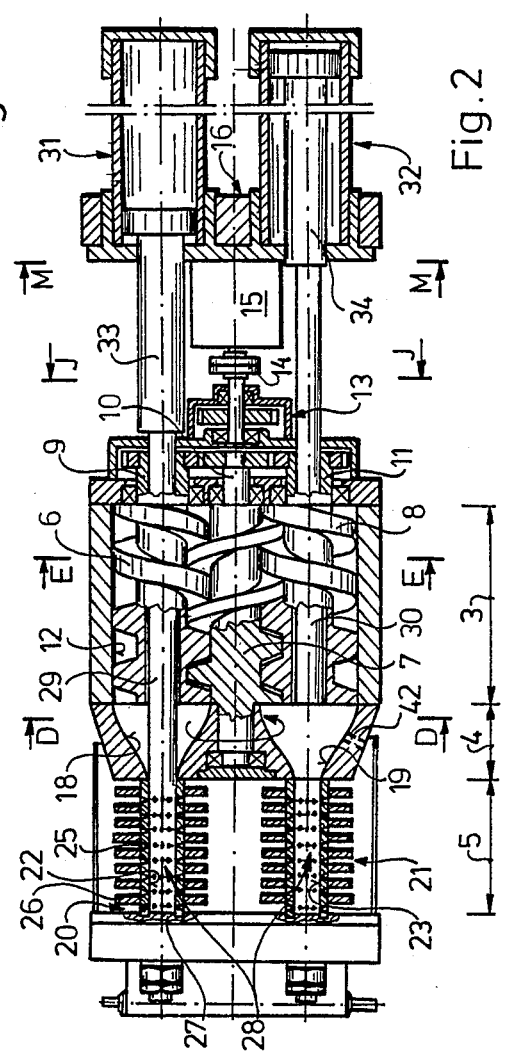

APPARATUS FOR COMMUNITION OF ORGANIC MATTERS

The invention relates to an apparatus for comminution of natural and artifical organic matters.

As known, the comminution of organic matters, e.g. various synthetics (foils, injection moulded and blown synthetics), wood and other vegetable parts, agricultural wastes, household garbage, worn tyres and other rubber-production wastes, etc. prior to further utilization is carried out mostly by grinding with the use of various hammer grinders, rotary grinders, roller mills or crushing extruders. Such solutions are described for example in the GFR patent specification No. 2 503 621 and 3 312 787, as well as in the U.S. Pat. No. 4,050,637 and French No. 2 278 399.

The main shortcoming of above comminuting machines is that they are energy-intensive and costly, furthermore as a result of the arising intensive friction, the comminuted material becomes very hot, since a decisive part of the energy input is undesirably converted to friction heat.

Known is furthermore such comminution described in the GFR patent specification No. 2 312 753, where inventors tried to improve the efficiency of mechanical comminution of waste rubber with preliminary deep-freeze. However, the practical experiences proved that the deep-freeze increased even further the already substantial expenditure.

According to the Hungarian patent specification No. 177 909, Japanese No. 1 288 310, Czechoslovakian No. 237 304 and U.S. Pat. No. 4,474,334 of the present applicant, the comminution of waste rubber, mainly rubber tires, takes place with cold yield, i.e. ambient temperature. Here the comminution apparatus is provided with a tool for receiving the material and a co-acting axially driven stamp, wherein the tool has a series of axial and/or radial yielding holes. With this apparatus functioning in intermittent operation mode, the specific demand for energy compared with the earlier apparatuses can be reduced, while the productivity is improved.

The present invention is aimed at realizing such comminution apparatus whereby the energy utilization is further reduced, it is universally suitable for the comminution of organic matters, and burden of the handling crew is reduced to the minimum.

According to the present invention, the apparatus includes a comminuting unit having at least one tool provided with axial and/or radial yielding holes and co-acting an axially driven stamp. This was further developed according to the invention in that before the comminuting unit—in the direction of movement of the organic matter to be comminuted—a compacting unit and before that a feeding-precompacting unit are arranged. Furthermore, the feeding-precompacting unit is provided with a driven worm, its discharged end is connected with a large cross sectional, bell-mouthed narrowing chamber of the compacting unit, while its reduced cross sectional end is joined to a pressure chamber of the tool.

Such construction is practical, where the feeding-precompacting unit, the compacting and comminuting units are arranged uniaxially, i.e. coaxially. This way a very compact arrangement with small space requirement can be obtained.

This apparatus may be converted to function in continuous operation mode, if the low-pressure feeding-precompacting unit, the intermediate-pressure compacting unit and high-pressure comminuting unit are doubled, whereby they function alternately.

Particularly effective feeding end precompaction can be achieved, if the low-pressure feeding-precompacting unit is provided with a centrally arranged third worm connected with the two parallel running worms, and these are arranged in the common functional space of the house and are connected with common drive of preferably adjustable speed. In this case it is particularly favourable if the two bell-mouthed, narrowing chambers of the compacting unit are in communication with each other. This way all three worms fill up alternately the two tools.

A very simple construction can be accomplished if the two axially and alternately driven stamps of the high-pressure comminuting unit are arranged in the tubular shaft of the two extreme worms of the low-pressure feeding-precompacting unit.

The yielding pressure can be substantially reduced with a further feature of the invention, namely if in case of the high-pressure comminuting unit the pressure chamber's cross section of the tool after the intial neckpart is greater than that of the stamp. In case of the simplest construction, the pressure chamber of the tool is cylindrical, the diameter of which is greater by at least 10% than that of the similarly cylindrical stamp.

Figure 11:
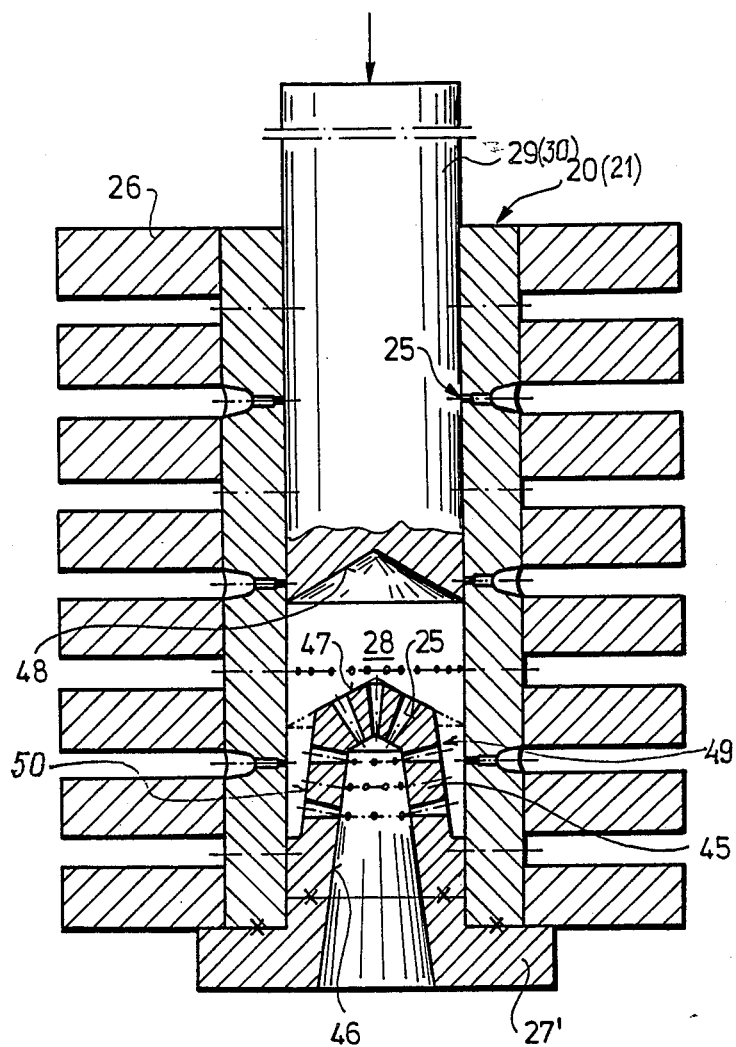

Various other feature and advantages of the present invention is described in detail below on the basis of the accompanying drawings, showing two embodiments of the invention by way of example, in which:

FIG. 1.: Side view of the first embodiment of the apparatus according to the invention, partly broken, FIG. 2.: Top view of the solution shown in FIG. 1., partly in section, FIG. 3.: Section along D—D shown in FIG. 2., FIG. 4.: Section along E—E shown in FIG. 2., FIG. 5.: Section along J—J shown in FIG. 2., FIG. 6.: Section along K—K shown in FIG. 1., FIG. 7.: Section along M—M shown in FIG. 2., FIG. 8.: Detail of the apparatus shown in FIG. 2., drawing to a larger scale, FIG. 9.: Second embodiment of the tool according to the invention, section, FIG. 10.: Diagram of the embodiments according to FIG. 8. and 9;

FIG. 11.: Third embodiment of the tool according to the invention, section.

As shown in the first embodiment of the organic matter comminuting apparatus according to FIG. 1–7., the comminuting apparatus contains a house 1 which is provided with a hopper 2 for admitting the organic matter to be comminuted. FIG. 2. clearly shows that the apparatus is divided into three main parts, such as a low-pressure feeding-precompacting unit 3, an intermediate-pressure compacting unit 4 and a high-pressure comminuting unit 5.

The feeding precompacting unit 3 in this case consists of three interconnected worms 6, 7, 8. These are arranged in the house 1 along a common horizontal plane and parallel with each other, their shafts 9, 10 and 11 are rotatably embedded in the house 1. (FIG. 2. and 4.). The two extreme shafts 9 and 11 are machined as tubular shafts, the roll of which will be dealt with later. A chamber 12 of the house 1 receives the worms 6, 7 and 8 (FIG. 2. and 6.), where the feeding and precompaction of the organic matter to be comminuted place between the extreme worms 6 and 8 and inner mantle of the chamber 12 in the house 1. In the present case the worms 6 and 8 are left threaded and the sense of their rotation is right, on the other hand worms 7 is right threaded and the sense of rotation is left.

The shafts 9–11 of the worms 6–8 are in driving connection with a common geared down drive 13 coupled through a clutch 14 with a driving motor 15. The driving motor 15 is mounted on a leg 16, and it may be a conventional electric or hydraulic motor with variable speed. Furthermore the house 1 is fixed through a leg 17 to a pedestal.

The compacting unit 4 is connected with the discharge end of the worms 6–8 of the low-pressure feeding-precompacting unit 3, provided with two bell-mouthed narrowing chambers 18 and 19 (FIG. 2.). In the chambers 18 and 19 of the compacting unit 4, the organic matter to be comminuted and already precompacted in the feeding-precompacting unit 3 is compacted under pressure e.g. between 30 and 100 bar (value of the compacting pressure always depends on the material to be comminuted) in order to improve the comminution efficiency.

The high-pressure comminuting unit 5 according to the invention is provided with tools 20 and 21 which are connected to the reduced cross sectional part of the bell-mouthed chambers 18 and 19 of the compacting unit 4. These tools 20 and 21 have tubular mantle 22 and 23 provided with radial yielding holes 25 (openings) evenly distributed along the length, and with similarly radial curbs 26, while its external end is closed with an endface 27. Naturally the end-face 27 may also be provided with axial yielding holes if necessary. The yielding holes 25 expand conically outwards. A pressure chamber of the tools 20 and 21 is marked with the reference number 28 (FIG. 2.).

The tools 20 and 21 of the high-pressure comminuting unit 5 co-act with axially displacable embedded stamps 29 and 30, which in the present case are freely displaceable on the tubular shafts 9 and 11, and connected to piston rods 33 and 34 of hydraulic working cylinders 31 and 32. The stroke of the hydraulic working cylinders 31 and 32 is conventionally variable.

FIGS. 2. and 6. show that the hydraulic working cylinder 31 with worm 6 and tool 20, and the hydraulic working cylinder 32 with worm 8 and tool 21 are coaxially arranged, resulting in a very compact construction.

A conveyor belt 35 is arranged below the tools 20 and 21 of the high-pressure comminuting unit 5 according to FIG. 1., to receive and deliver the comminuted product.

The apparatus fixed through the legs 16 and 17 to the pedestal is clamped in the present case by four bars 36–39 loaded exclusively for tension, the threaded ends of which are fitted with nuts 40 and 41. This way absorption of the reaction forces is fairly simplified.

In the course of our experiments, the diameter of the yielding holes 25 was selected to be between 1.5 and 5 mm, the diameter of the pressure chambers 28 of the tools 20 and 21 to 50 mm, and the diameter of the worms 6–8 to 200 mm, depending on the type of organic matter to be comminuted.

In a given case, for the comminution of organic matter with high moisture content, e.g. fresh twigs, waste wood, the chambers 18 and 19 of the compacting unit 4 may be provided with one or several holes 42 (marked with dashed line in FIG. 2,), connected with the exterior. Through this, the moisture is extracted from the apparatus during compaction step.

Figure 8:
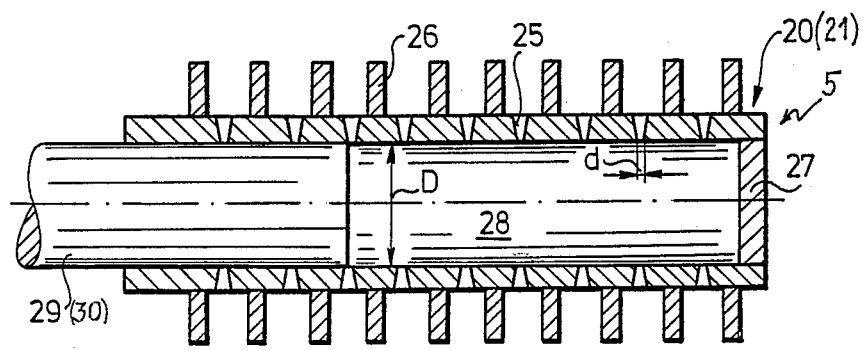

FIG. 8. shows the basic type of the tool 20 or 21 according to the invention, where diameter of the conically outward expanding yielding holes 25 is marked with d, and the diameter of the cylindrical pressure chamber 28 is marked with D. (The latter one concurs with the diameter of stamp 29 or 30 in this embodiment).

Figure 9:
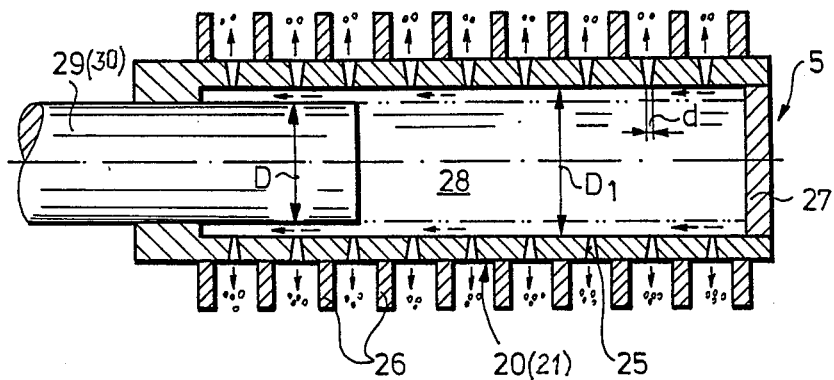

FIG. 9 shows a preferred embodiment of the tool 20 or 21 according to the invention, which is fundamentally different in that the diameter $D_1$ of the pressure chamber 28 is greater than the diameter D of stamp 29 or 30. This diameter, or cross-section increment is preferably at least 10% according to the invention, in the present case the value of $D_1$ was selected to be 60 mm, and the diameter D of the stamp 29 or 30 to be 50 mm.

Comminution with the tools according to FIGS. 8. and 9. is fundamentally different in that according to the solution shown in FIG. 8 more and more yielding holes 25 are closed with the stamp 29 or 30, thus—assuming steady speed of the stamp—the yielding pressure in the pressure chamber 28 successively rises, since the free yielding cross section becomes reduced. But in the solution according to FIG. 9. the yielding pressure prevailing in the pressure chamber 28 will remain almost throughout the same during the movement of the stamp 29 or 30, i.e. it concurs with the initial minimal critical yielding pressure, since all yielding holes 25 remain free all the time (backflow of the material was marked with dashed arrows).

Figure 10:
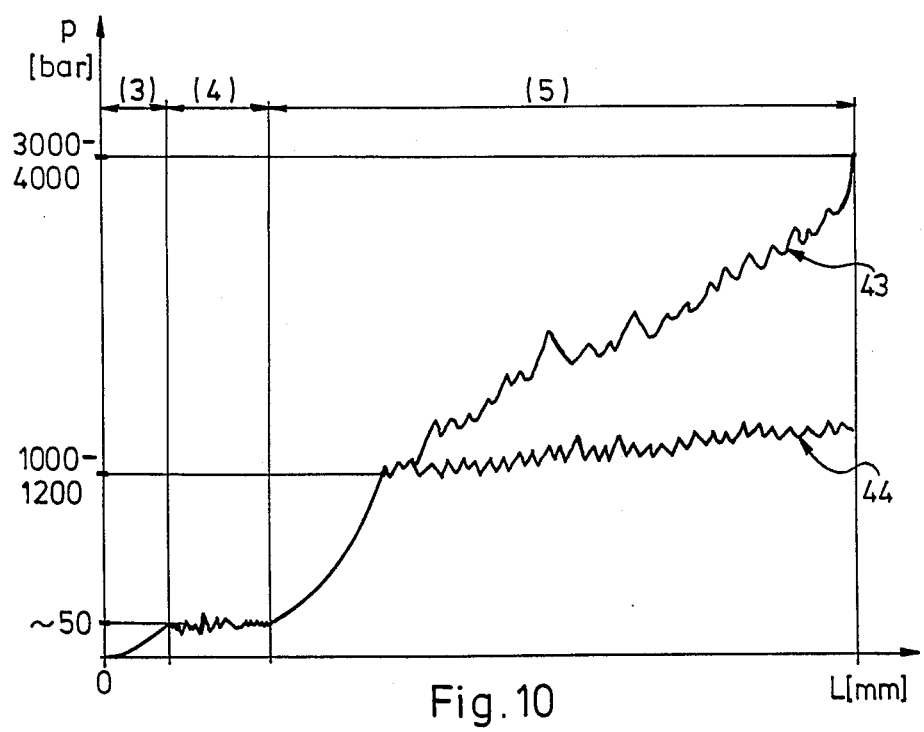

The dissimilarity of above two versions is well illustrated by the diagram of FIG. 10., where the vertical axis represents the pressure (p) and the horizontal axis the stroke (L) of the stamp 29 or 30. Here the phase (5) refers to the yielding phase of the comminuting unit 5, where in FIG. 8. is marked with 43 as well as the curve shown in FIG. 9. is marked with 44.

FIG. 10 clearly shows the functions preceding the yielding, thus the low-pressure phase (3) refers to the feeding-precompacting unit 3 and the phase (4) to the intermediate-pressure compacting unit 4.

In operation, the organic matter to be comminuted is continuously admitted into the hopper 2, for example from the storage bunker, with the aid of e.g. a conveyor belt (not shown). The worms 6–8 of the feeding-precompacting unit 3 deliver the admitted organic matter towards the compacting unit 4, at the same time it is precompacted.

Meanwhile 30–100 bar pressure may develop in the chamber 12, depending on the material to be comminuted (about 50 bar according to FIG. 10.).

FIG. 10. clearly shows that the intermediate-pressure in the compacting unit 4 is essentially invariable, on the other hand the material becomes properly compacted due to the conically narrowing mantle of the chambers 18 and 19, and in this condition it passes to the tools 20 and 21 of the comminuting unit 5. Since in this case, the chambers 18 and 19 of the compacting unit 4 are in communication with each other, the worms 6-8 of the feeding-precompacting unit 3 feed continuously the organic matter to be comminuted through the chambers 18 and 19 alternately into the tools 20 and 21. Since the double-action hydraulic working cylinders 31 and 32 function alternately, upon the stroke of these the axially driven stamps 29 and 30 become alternately pressed into the filled up preserve chamber 28 of the tools 20 and 21 respectively.

FIG. 10. shows, that in case of the embodiment according to FIG. 8., a peak pressure between 3000 and 4000 bar is brought about in the pressure chamber 28 of the tool 20 or 21, while in the version according to FIG. 9. the pressure is max. 1000–1200 bar in the pressure chamber 28. As soon as the yielding is completed in the tool 20, the yielding begins immediately in the tool 21, thus regarding the whole apparatus, nearly continuous operation mode is attained, controlled hydraulically with a conventional simple method.

The comminuted organic matter leaves the just functioning tool 20 or 21 in nearly constant quantity at a steady rate. The product falling through the yielding holes 25 on to the conveyor belt 35 looks like earthworm or fragmented earthworm in case of comminution of waste rubber, but it looks granulated in case of comminution of wood and plastics.

The speed of worms 6–8 is selected according to the material to be comminuted. Thus, for porous material, e.g. wood, a higher speed, but for less porous materials, e.g. plastics, rubber, a lower speed is advisable. In the course of our experiments with the illustrated embodiments the time of stroke of the hydraulic working cylinders 31 and 32 was selected to be 15 s.

Operation of the apparatus according to the invention can be automated in a relatively simple way, when the activity of the handling crew is restricted only to the starting and control. Incidental failures, e.g. clogging of feeding, or lack of material can be indicated automatically by the apparatus. The automation and control are not dealt with in detail, since in knowledge of the invention they are obvious for a person skilled in the art.

The excellent balance of energy of the illustrated apparatus according to the invention verified by experiments is attained by having the structural parts of the low-pressure feeding-precompacting unit 3, the intermediate-pressure compacting unit 4 and high-pressure comminuting unit 5 in contact with the material coaxially arranged, whereby the material flows along a straight line throughout from the worms to the pressure chambers 28 of the tools 20, 21. This results in a very compact arrangement, thus requiring small space.

The apparatus according to the invention is universally applicable for the comminution of any organic matter, using substantially less energy than the known apparatuses. The apparatus according to the invention presents the possibility for the comminution, pelleting of different wood varieties, such as twigs, parings, agricultural stalks of crop and household garbage. Prior to comminution of the household garbage, the organic waste has to be free from metal. This way the household garbage in compact and comminuted form can be transported with considerably improved efficiency, and it is better utilized e.g. by burning in boiler.

The apparatus according to the invention is particularly suitable for the fine grinding of demetallized and precomminuted rubbers, or for the comminution of synthetic and similar materials cut up to size suitable for admitting into the hopper 2. These fine granulated materials can be well utilized as secondary raw material in the rubber and synthetics industry. In a given case a conventional piece cutter can be built above the hopper 2.

Naturally the apparatus according to the invention may also function in intermittent operation mode too, where the feeding-precompacting unit 3 consists of a single worm, the compacting unit 4 of a single conically narrowing chamber, and the comminuting unit 5 consists of a single tool and a co-acting stamp. However, the essential advantage of the double construction in the continuous operation mode.

Significant advantage of the tool shown in FIG. 9. is that the yielding pressure can be reduced to its third, whereby the comminution is very energy saving. It is to be noted that the pressure chamber 28 shown in FIG. 9. does not have to be cylindrical, and this pressure chamber 28 with mantle conically narrowing or expanding towards the two ends, moreover curved as a barrel is also conceivable. Even the cross section of the pressure chamber 28 may deviate from the circle, it may be for example polygonal or elliptical.

Finally such version of the comminuting unit 5 is also feasible, where the stamp is stationary, and the tool or even both of them can be driven in axial direction.

A further embodiment of the tool 20 or 21 according to the invention is shown in FIG. 11.

This differs from the one shown in FIG. 9., in that the pressure chamber 28 is closed by an end-element 27', instead of end-face. The end-element 27' is provided with a hollow extension 45 conically narrowing inwards, a cavity of which in communication with the exterior is marked with reference number 46. The cavity 46 is also provided with yielding holes 25. The front end of the hollow extension 45 facing the pressure chamber 28 is formed as cone 47. This co-acts with a conical cavity 48 on the front end of the stamp 29 or 30.

This construction is suitable for comminution in the vicinity of end-element 27' as well. On the other hand, there is an annular chamber 49 between the inner mantle of the tool 20 or 21, (that is of the pressure chamber 28) and an outer conical mantle 50 of the hollow extension, with the same affect as mentioned according to FIG. 9.

What we claim is:

1. Apparatus for comminution of organic matters, such as, comprising a comminuting unit having at least one tool having a pressure chamber and provided with yielding holes and co-acting axially driven stamp, wherein an intermediate-pressure compacting unit (4) before the comminuting unit (5), in respect of the direction of movement of the organic matter to be comminuted, and a low-pressure feeding-precompacting unit (3) preceding the compacting unit (4) are arranged, furthermore the feeding-precompacting unit (3) is provided with at least one driven worm (6; 7; 8), the discharge end of which is connected with a larger cross sectional end of a bell-mouthed narrowing chamber (18; 19) of the compacting unit (4), while a reduced cross sectional end of the chamber (18; 19) is joined to the pressure chamber (28) of the tool (20; 21).

2. Apparatus as claimed in claim 1, wherein the worm (6) of the feeding-precompacting unit (3), the bell-mouthed narrowing chamber (18) of the compacting unit (4) and the tool (20) of the comminuting unit (5) are coaxially arranged.

3. Apparatus as claimed in claim 1 wherein the feeding-precompacting unit (3) is provided with two parallel arranged worms (6, 8), and the compacting unit (4) has two chambers (18,19), and the comminuting unit (5) has two tools (20, 21) and two axially alternately drive stamps (29, 30).

4. Apparatus as claimed in claim 3, wherein the two bell-mouthed narrowing chambers (18, 19) of the compacting unit (4) are in communication with each other.

5. Apparatus as claimed in claim 3 wherein the feeding-precompacting unit (3) is provided with a central worm (7) connected with the two parallel arranged worms (6, 8), these are arranged in a common functional chamber (12) of the house (1) and are connected with common drive (13) preferably adjustable speed.

6. Apparatus as claimed in claim 3, wherein the stamps of the comminuting unit are guided through tubular shafts of the worms within the feeding-precompacting unit.

7. Apparatus as claimed in claim 1 wherein the cross section of the pressure chamber (28) of the tools (20, 21) of the comminuting unit (5) is greater than that of stamps (29, 30).

8. Apparatus as claimed in claim 7, wherein the pressure chamber (28) of the tools (20, 21) is cylindrical, the diameter ($D_1$) of which is greater by at least 10% than the diameter (D) of the stamps (29, 30).

9. An apparatus for comminution of organic material, such as synthetics, wood, agricultural wastes, and rubber, comprising:
 (a) a comminution unit having a tool provided with a cylindrical pressure chamber to receive said organic materials to be crushed and with a driven stamp axially displaceable and arranged to move within said chamber, said chamber being provided with a plurality of yielding openings;
 (b) an intermediate-pressure compacting unit positioned at the input to said comminuting unit and configured to compact said material as it advances in the direction of the movement of the organic matter to be comminuted, said compacting unit and being formed as a bell-mouthed narrowing chamber;
 (c) a feeding-precompacting unit positioned to feed said compacting unit and comprising a driven worm; said worm of the feeding precompacting unit, and said bell-mouthed narrowing chamber of the compacting unit being coaxially arranged and said driven stamp being guided in a tubular shaft of the worm and through said bell-mouthed narrowing chamber.

10. Apparatus as claimed in claim 9, wherein the feeding-precompacting unit is provided with two parallel arranged worms, the compacting unit has two chambers and the comminution unit has two tools and two axially alternately driven stamps.

11. Apparatus as claimed in claim 10, wherein the two bell-mouthed narrowing chambers of the compacting unit are in communication with each other.

12. Apparatus as claimed in claim 10, wherein the feeding-compacting unit is provided with a central worm connected with the two parallel arranged worms, said worms being arranged in a common functional chamber of a housing and are connected to a common drive.

13. Apparatus as claimed in claim 9, wherein the cross section of the pressure chamber of the tools of the comminuting unit is greater than that of the stamps.

14. Apparatus as claimed in claim 13, wherein the pressure chamber of the tools is cylindrical, the diameter which is greater by at least 10% than the diameter of the stamps.

15. Apparatus for comminuting material, comprising;
 (a) a comminuting die defining a pressure chamber for receiving organic material to be crushed and further defining a plurality of small output openings and further defining an input port;
 (b) a driven stamp configured and dimensioned to pass through said input port, and slidingly and matingly engage said chamber for movement into and out of said chamber;
 (c) a compacting unit having an output coupled to said port of said die and having an input, said compacting unit defining a funnel-shape narrowing chamber, said chamber having a wide end and a narrow end, said narrow end comprising the output of said compacting unit and said wide end comprising an input of said unit; and
 (d) a feeder pre-compacter comprising a driven worm for receiving organic material and advancing said organic material into said compacting unit, said driven worm defining a passage for receiving said driven stamp, whereby said driven stamp may be driven through said given worm, said compacting unit and said die.

16. Apparatus as in claim 15, wherein said feeder pre-compacter comprises two parallel driven worms advancing said material into said compacting unit comprising two chambers, said chambers' outputs communicating with input ports of two comminuting dies, said dies each having an associated driven stamp.

17. Apparatus as claim 16, wherein the two chambers of said compacting unit are in communication with each other.

18. Apparatus as in claim 16, wherein the feeder pre-compacter is provided with a central worm connected with said two parallel worms, said worms being arranged in a common functional chamber of the housing and said central worm connected to a drive unit.

19. Apparatus as in claim 15, wherein the cross-section of said comminuting die is greater than the cross-section of said driven stamp.

20. Apparatus as in claim 19, wherein said comminuting die is cylindrical in shape and the cross-section of said die is circular with a diameter that is at least ten per cent greater than the cross-section of the driven stamp, said driven stamp being cylindrical in shape and having a circular cross-section.

* * * * *